US011874724B2

United States Patent
Gong et al.

(10) Patent No.: US 11,874,724 B2
(45) Date of Patent: Jan. 16, 2024

(54) MECHANISM OF ENABLING FAULT HANDLING WITH PCIE RE-TIMER

(71) Applicant: Intel Corporation, Santa Clara, CA (US)

(72) Inventors: Haifeng Gong, Shanghai (CN); Manisha M. Nilange, Portland, OR (US); Shiwei Xu, Shanghai (CN); Xiaoxia Fu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 17/255,317

(22) PCT Filed: Sep. 28, 2018

(86) PCT No.: PCT/CN2018/108442
§ 371 (c)(1),
(2) Date: Dec. 22, 2020

(87) PCT Pub. No.: WO2020/062075
PCT Pub. Date: Apr. 2, 2020

(65) Prior Publication Data
US 2021/0271537 A1    Sep. 2, 2021

(51) Int. Cl.
*G06F 11/00*    (2006.01)
*G06F 11/07*    (2006.01)
(Continued)

(52) U.S. Cl.
CPC ...... *G06F 11/0757* (2013.01); *G06F 11/0706* (2013.01); *G06F 11/0787* (2013.01);
(Continued)

(58) Field of Classification Search
CPC ............ G06F 11/0757; G06F 11/0706; G06F 11/0787; G06F 11/0793; G06F 11/0712; G06F 11/0736
See application file for complete search history.

(56) References Cited

U.S. PATENT DOCUMENTS

| 10,063,365 B1 | 8/2018 | Ribo et al. |
| 2005/0086336 A1 | 4/2005 | Haber |

(Continued)

FOREIGN PATENT DOCUMENTS

| CN | 105793915 A | 7/2016 |
| CN | 106970866 A | 7/2017 |

OTHER PUBLICATIONS

International Search Report and Written Opinion for International Application No. PCT/CN2018/108442 dated Jun. 29, 2019 (6 pgs.).
(Continued)

*Primary Examiner* — Katherine Lin
(74) *Attorney, Agent, or Firm* — Alliance IP, LLC

(57) ABSTRACT

An extension device is positioned within a point-to-point link to connect two devices, where the extension device includes error detection circuitry to detect a set of errors at the extension device. The extension device further includes memory to store an event register, where the extension device is to write data to the event register to describe detection of an error by the error detection circuitry. The extension device further includes a transmitter to transmit a notification signal to indicate the detection of the error and presence of data in the evert register associated with the error.

12 Claims, 15 Drawing Sheets

(51) Int. Cl.
*G06F 13/40* (2006.01)
*G06F 13/42* (2006.01)

(52) U.S. Cl.
CPC ...... *G06F 11/0793* (2013.01); *G06F 13/4068* (2013.01); *G06F 13/4282* (2013.01); *G06F 2213/0026* (2013.01)

(56) References Cited

U.S. PATENT DOCUMENTS

2007/0014259 A1* 1/2007 Fajardo ............. H04W 36/0011
   370/331
2015/0295679 A1 10/2015 Valliappan
2016/0377679 A1* 12/2016 Froelich ........... G01R 31/31725
   714/735

OTHER PUBLICATIONS

PCT International Preliminary Report on Patentability issued in PCT/CN2018/108422, dated Apr. 8, 2021; 5 pages.

* cited by examiner

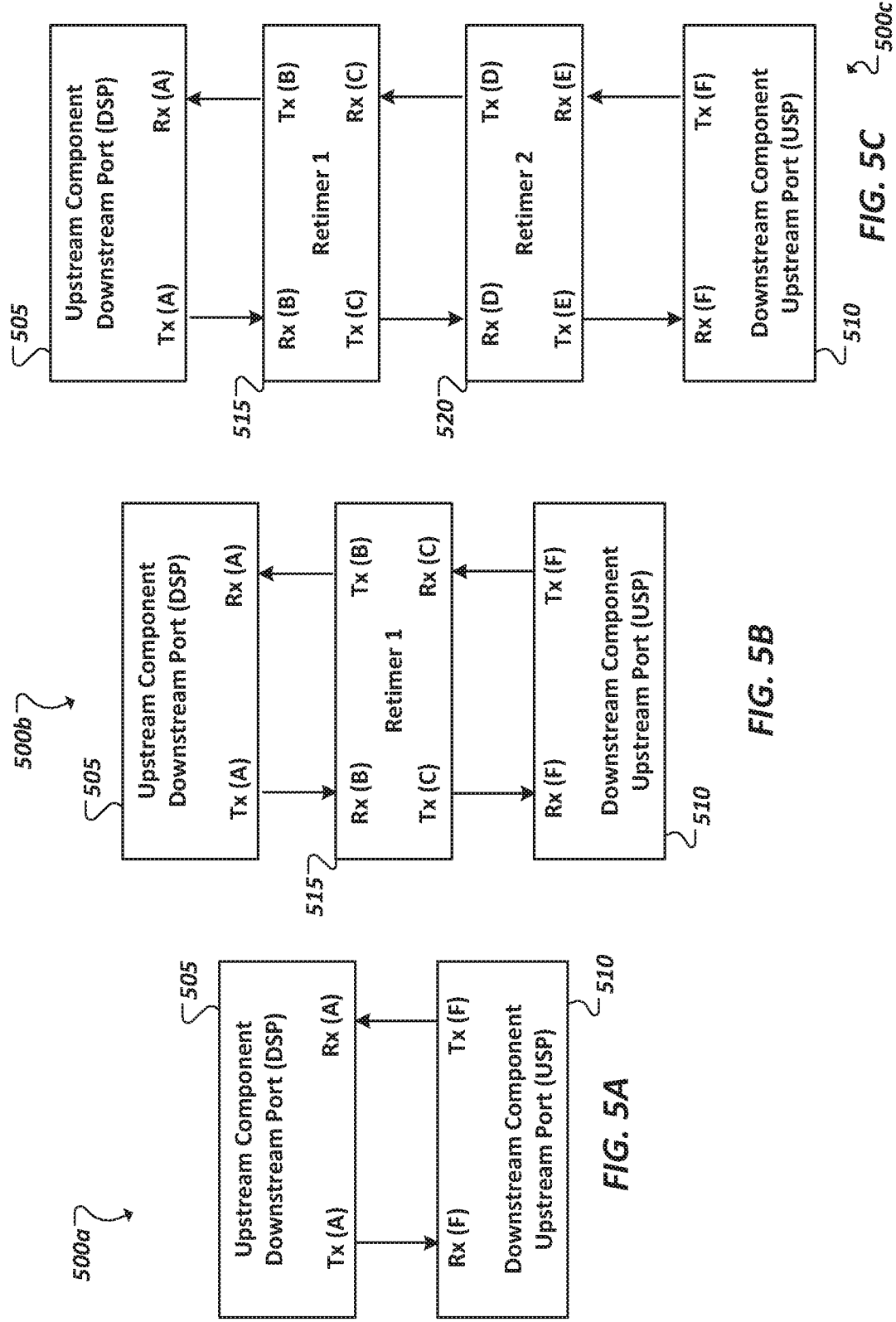

MECHANISM OF ENABLING FAULT HANDLING WITH PCIE RE-TIMER

CROSS-REFERENCE TO RELATED APPLICATIONS

This application is a national stage application under 35 U.S.C. § 371 of PCT International Application Serial No. PCT/CN2018/108442, filed on Sep. 28, 2018, and entitled "ERROR REPORTING IN LINK EXTENSION DEVICES," the entire disclosure of which is incorporated herein by reference.

FIELD

This disclosure pertains to computing system, and in particular (but not exclusively) to extension devices in point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modem servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 5A-5C illustrate simplified block diagrams of example links including one or more extension devices.

DETAILED DESCRIPTION

Figure 1:
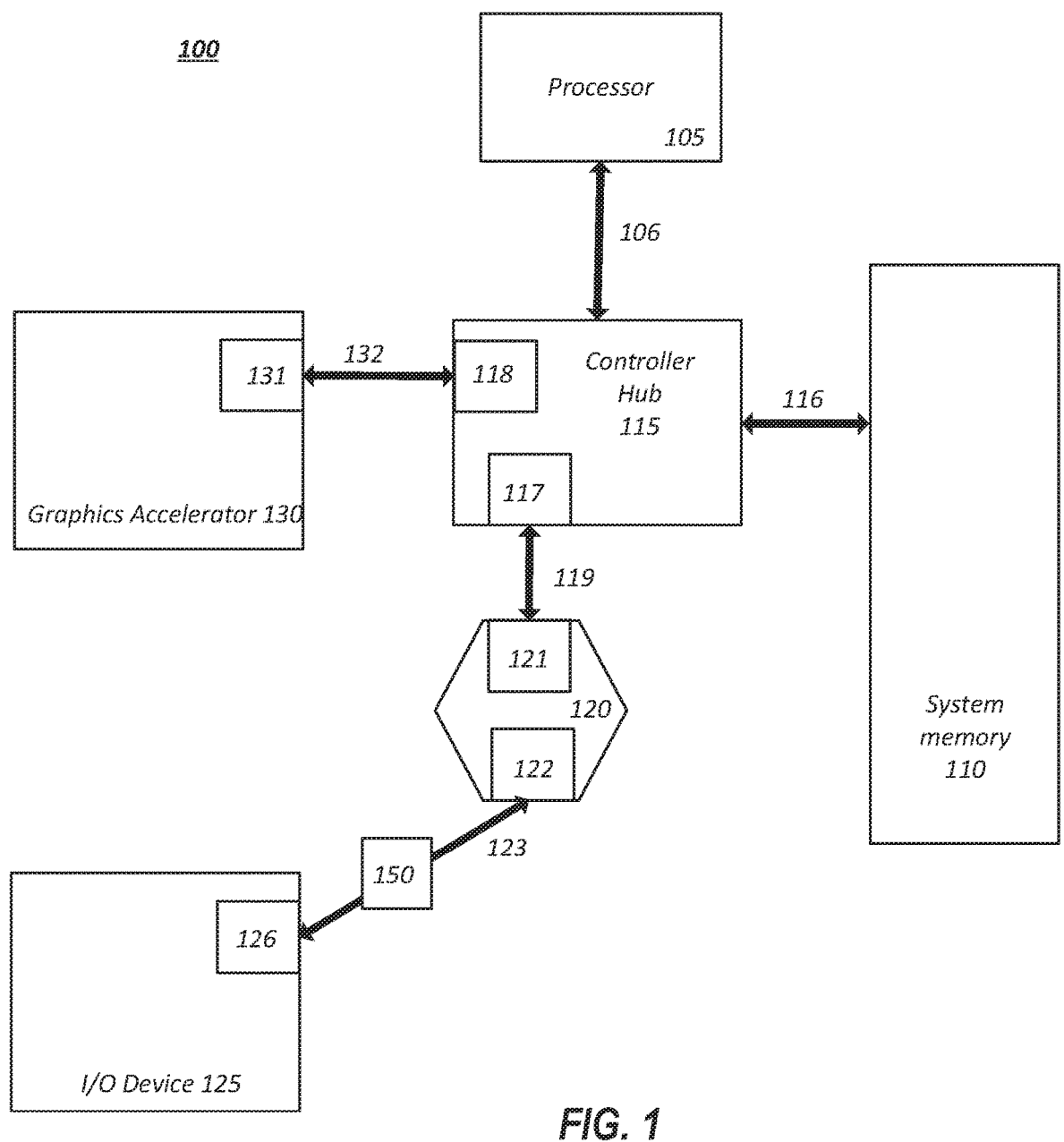
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects. Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, redrivers, repeaters, etc.

Figure 2:
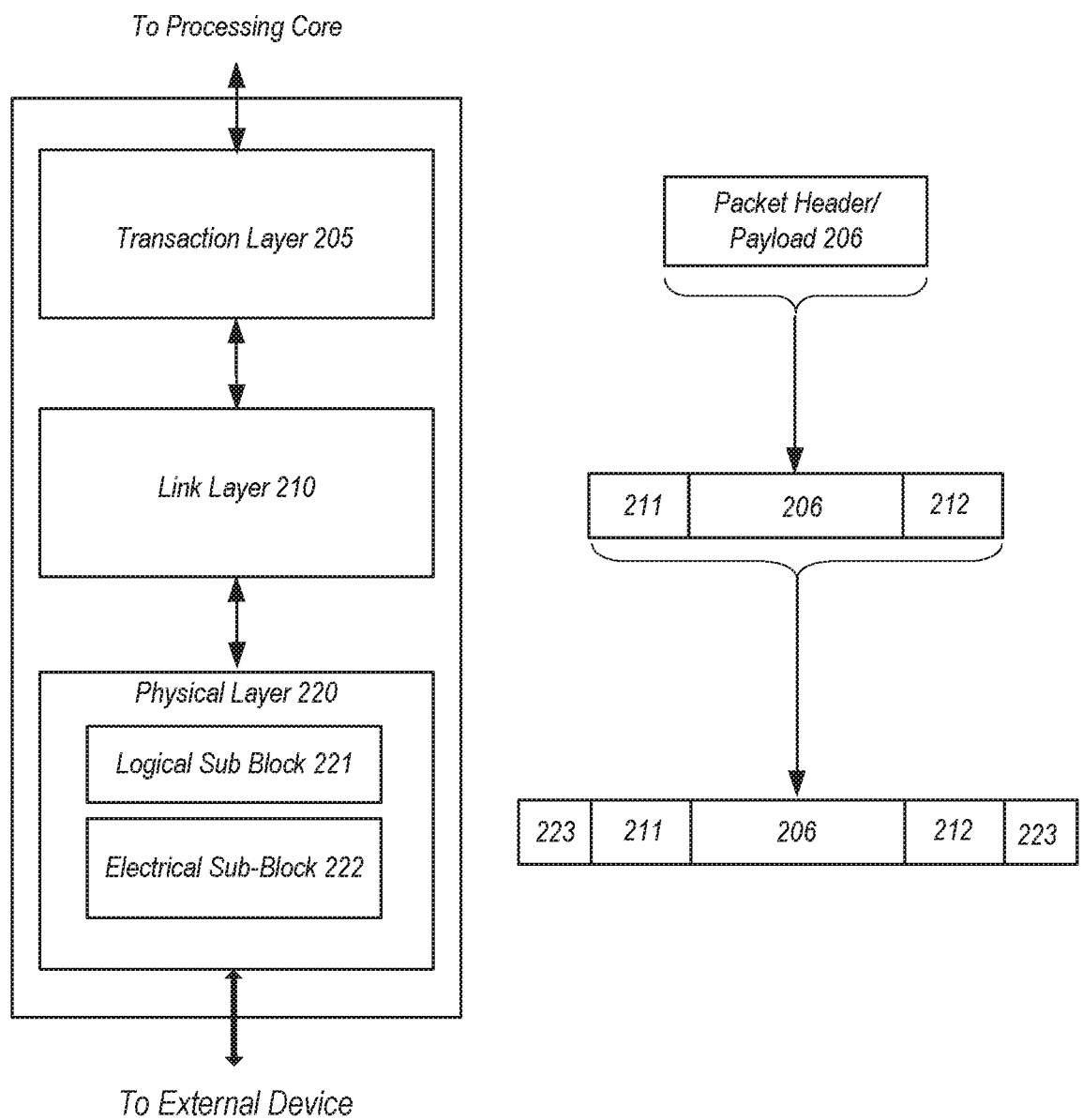
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
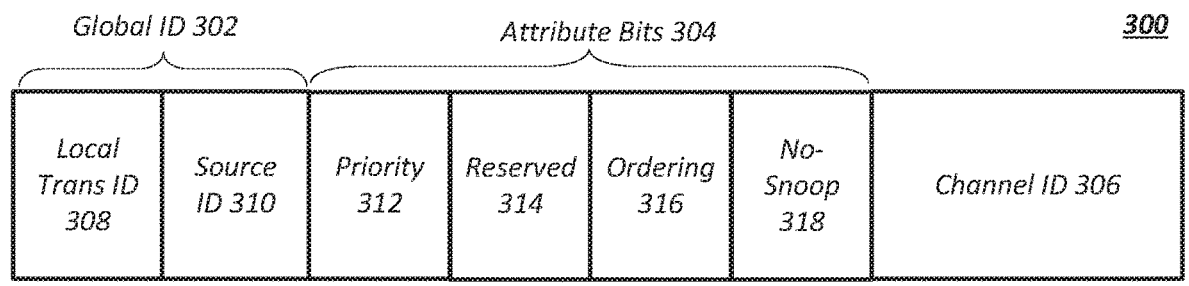
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
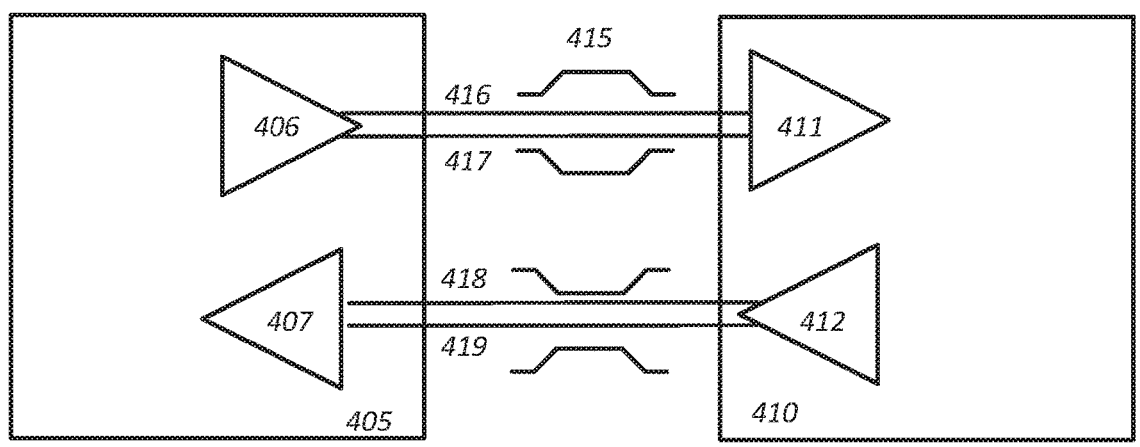
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a link, such as a link compliant with PCIe, USB, UPI, or other interconnect protocol, can include one or more retimers or other extension devices, such as a redriver or repeater. A retimer device (or simply "retimer"), can include active electronic devices that receive and re-transmit (retime) digital I/O signals. Retimers can be used to extend the length of a channel that can be used with a digital I/O bus.

FIGS. 5A-5C are simplified block diagrams 500a-c illustrating example implementations of a link interconnecting two system components, or devices, such as upstream component 505 and downstream component 510. An upstream component 505 and downstream component 510 can be connected directly, in some instances, with no retimers, redrivers, or repeaters disposed on the link between the two components 505, 710, such as shown in the example of FIG. 5A. In other instances, a retimer (e.g., 515) can be provided to extend the link connecting upstream component 505 and downstream component 510, such as illustrated in FIG. 5B. In still other implementations, two or more retimers (e.g., 515, 520) can be provided in series to further extend a link connecting upstream component 505 and downstream component 510. For instance, a particular interconnect technology or protocol may specify a maximum channel length and one or more retimers (e.g., 515, 520), can be provided to extend the physical length of the channel connecting two devices 505, 510. For instance, providing retimers 515, 520 between upstream component 505 and downstream component 510 can allow a link three times the maximum length specified for a link without these retimers e.g., 515, 520, among other example implementations.

Figures 6A, 6B:
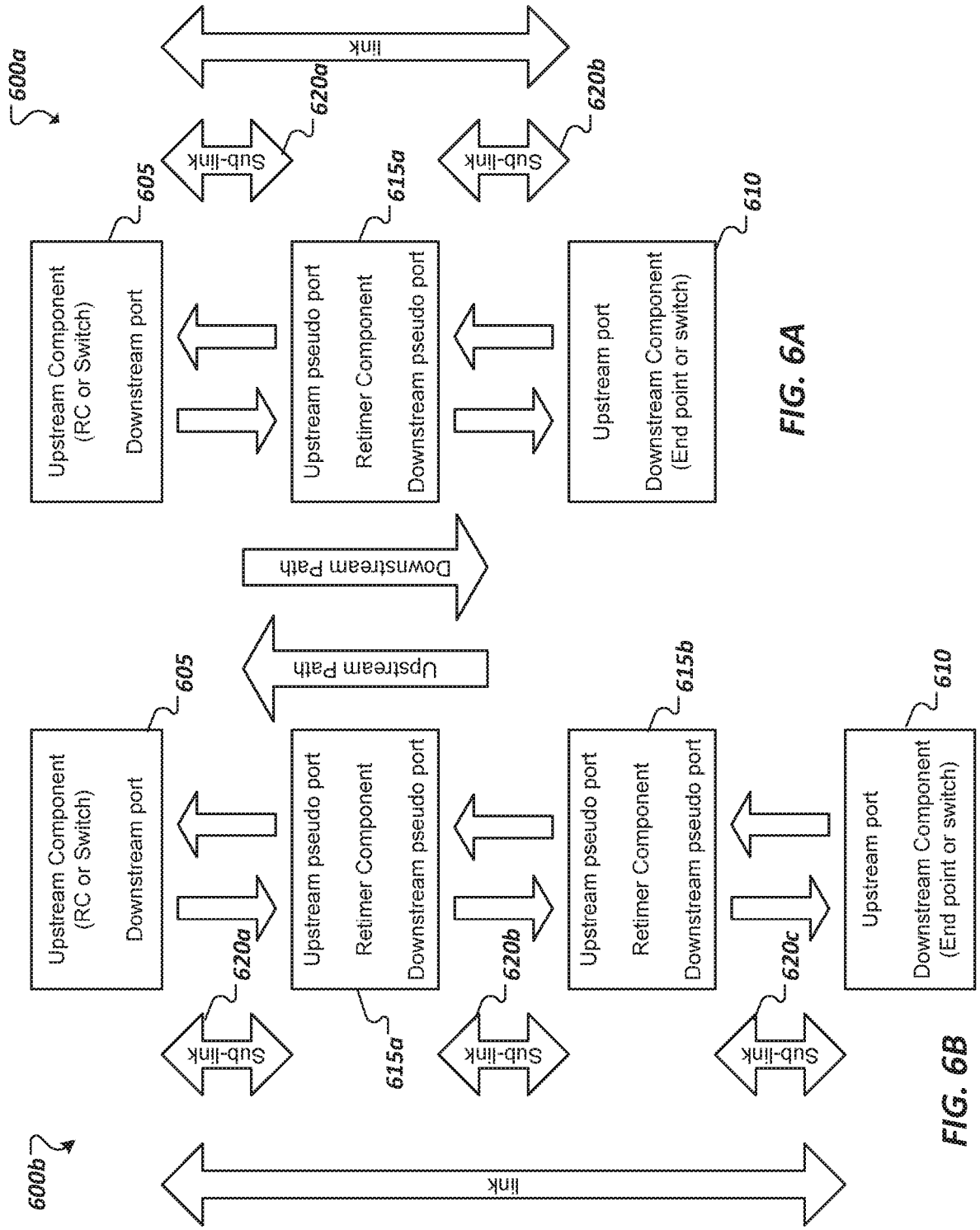
FIGS. 6A-6B illustrate simplified block diagrams of systems including example extension devices.

A link incorporating one or more retimers can form two or more separate electrical sub-links at data rates comparable to data rates realized by links employing similar protocols but with no retimers. For instance, a link including a single retimer can form a link with two separate sub-links, each operating at 8.0 GT/s or higher. FIGS. 6A-6B illustrate simplified block diagrams 600a-b of example links including one or more retimers. For instance, in FIG. 6A, a link connecting a first component 605 (e.g., an upstream component) to a second component 610 (e.g., a downstream component) can include a single retimer 615a. A first sublink 620a can connect the first component 605 to the retimer 615a and a second sublink 620b can connect the retimer 615a to the second component. As shown in FIG. 6B, multiple retimers 615a, 615b can be utilized to extend a link. Three sublinks 620a-c can be defined through the two retimers 615a, 615b, with a first sublink 615a connecting the first component to the first retimer 615a, a second sublink connecting the first retimer 615a to the second retimer 615b, and the third sublink 615c connecting the second retimer 615b to the second component.

As shown in the examples of FIGS. 6A-6B, in some implementations, a retimer can include two pseudo ports, and the pseudo ports can determine their respective downstream/upstream orientation dynamically. Each retimer 615a, 615b can have an upstream path and a downstream path. Further, retimers 615a, 615b can support operating modes including a forwarding mode and an executing mode. A retimer 615a, 615b in some instances can decode data received on the sub-link and re-encode the data that it is to forward downstream on its other sublink. In some cases, the retimer can modify some values in the data it receives, such as when processing and forwarding ordered set data. Additionally, a retimer can potentially support any width option as its maximum width, such as a set of width options defined by a specification such as PCIe.

As data rates of interconnects (e.g., PCIe, UPI, Open-CAPI™, Gen-Z™, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, etc.) increase, retimers are increasingly used to extend the channel reach. Retimers may capture the received bit stream prior to regenerating and re-transmitting the bit stream. In some cases, retimers may be protocol-aware and possess a full physical layer or even additional logic to implement a portion of the protocol stack to allow the retimer to participate in portions of the link training and negotiation (LTSSM), including transmitter/receiver equalization, and other link training activities. However, in high speed links, implementing a retimer with a full protocol stack or complete physical or link layer logic, etc., may add unacceptable latency for links that connect two or more devices over one or more retimers. Indeed, there are growing numbers of applications that are likely to utilize retimers or other channel extension devices as the operating frequencies of external interfaces continue to increases while channel improvement improves more at a more modest pace. Further, many applications call for longer channel lengths, such as data center, cloud, and server applications where interconnect channels can span several inches, pushing or exceeding the maximum channel lengths supported natively by emerging high speed interconnects. For example, PCI Express Gen 4, designed to operate at a frequency of 16.0 GT/s, may provide for a particular limited maximum channel length (e.g., 14" or less). For server applications, where the channel lengths may typically exceed 20 inches, a retimer, redriver, or other repeater elements may be sought after to extend the channel. Similarly, for an Ultra Path Interconnect (UPI) cache-coherent interface, extension devices may be likewise utilized to support longer-length platforms at 10.4 GT/s, among other examples.

The speed of high speed differential serial links continues to increase, with speeds of future standard and non-standard applications expected to increase further. Notwithstanding these advancements, the physical size of many systems and devices has stayed unchanged—making the high speed differential channels more challenging to design as the I/O speeds increase. Many channel designs now require an active extension device such as a retimer and the percentage of channel designs where an extension device is required are increasing. Extension devices may include such examples as repeaters, redrivers, and retimers. Of these examples, retimers offer the greatest extension (100% per retimer) together with guaranteed interoperability. However, retimers also have some drawbacks versus simpler analog-only redriver extension devices, including increased cost, latency, and power. Accordingly, developing and implementing retimers for high speed interfaces may face a variety of issues. For example, in high speed cache-coherency protocols, a channel may be extremely sensitive to latency, such that adding even nanoseconds of additional latency per retimer hop becomes untenable due to the performance loss introduced through the retimer(s). Latency may also be an issue in examples such as in memory applications (e.g., Memory Drive and Memory Services Processor), and such challenges are only expected to worsen as the next-generation non-volatile memory (NVM) technologies provide higher bandwidth and lower latency, closing the gap with double data rate (DDR) memory (e.g., DDR synchronous dynamic random-access memory (SDRAM)).

Extension devices, in some implementations, may natively lack mechanisms and logic to detect and report errors occurring or primarily detectable at the extension device. As a result of no standardized fault handling mechanisms at the extension device, this results in the similar absence of any standardized mechanism to locate the source of a link error or the presence of a failing device on a link that includes one or more extension devices. Such shortcomings may thereby cripple the corresponding system's Reliability, Availability and Serviceability (RAS) capabilities due to the inability to monitor and fault handle on the extension devices. Given this, link recovery protocols may be undermined, which may not only discourage the adoption and use of extension devices, but also the adoption of next generation interconnect protocols and corresponding links, where speed is to increase yet further and create additional pressure on the physical lengths of interconnect channels, among other example issues.

Figure 7:
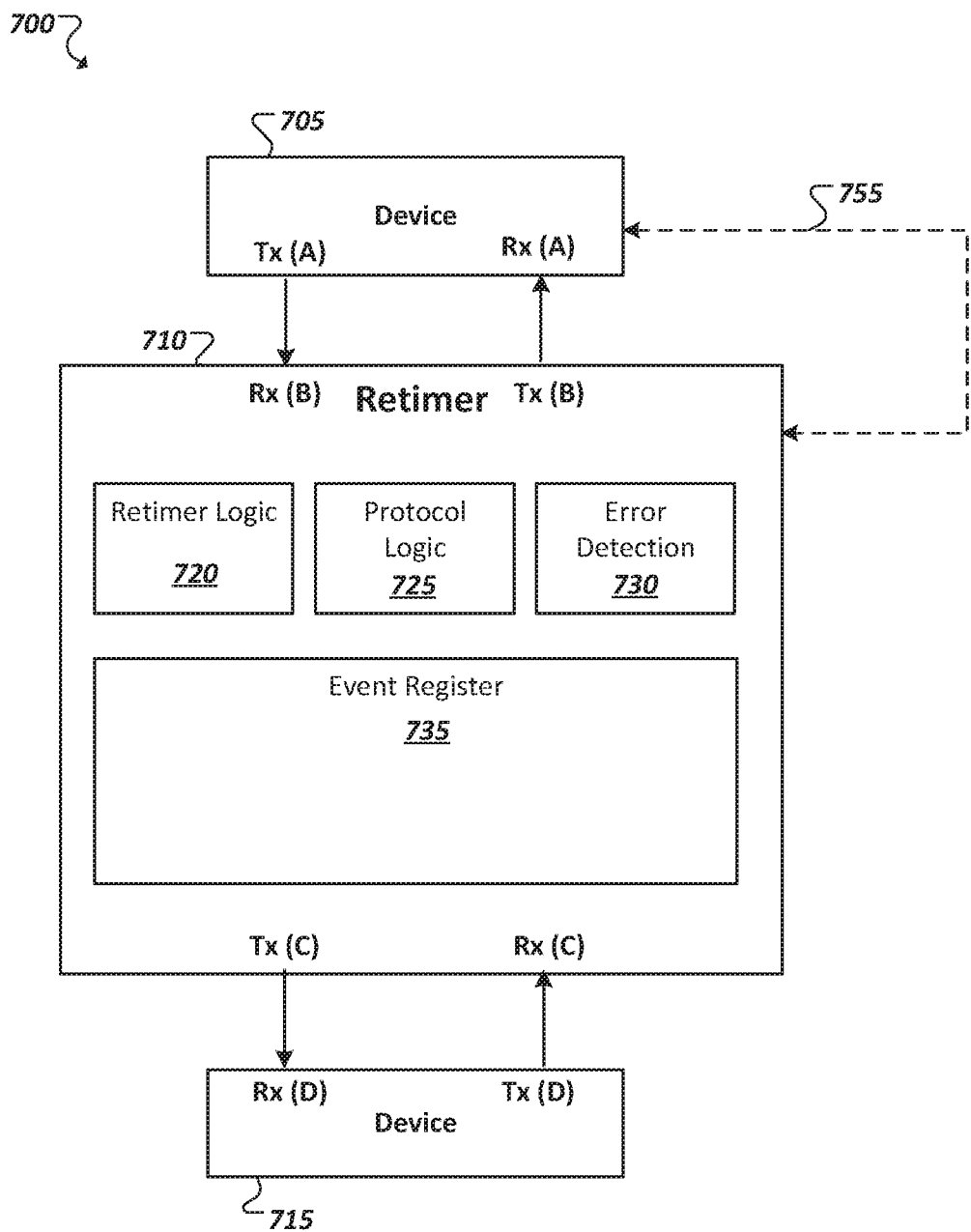
FIG. 7 illustrates a simplified block diagram of an example retimer device.

Turning to FIG. 7, a simplified block diagram 700 is shown illustrating an example implementation of an enhanced retimer 710 equipped with logic to enable the retimer 710 to detect and record errors and other events at the retimer 710, allowing these recorded events to be consumed by software or hardware at one or both of the upstream (e.g., 705) and downstream (e.g., 715) endpoint devices on the link to better detect and diagnose errors and other events affecting the link. In one example implementations, the retimer may include retimer logic 720, implemented at least in part in hardware circuitry to regenerate signals and corresponding data received by the retimer 710 (e.g., on receiver Rx (B) or Rx (C)) to forward these regenerated signals downstream on the corresponding transmitter (e.g., Tx(C) or Tx(B) respectively). Protocol logic 725 may additional be provided in some implementations of a retimer 710 but may represent a subset of the circuitry and other logic required to implement a full protocol stack of a particular interconnect protocol (e.g., OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, etc.). For instance, in one example, the protocol logic 725 may be limited to physical layer logic of one or more protocols and may be utilized to enable the retimer to participate in equalization, electrical idle exit/entry, speed changes, link width negotiation and changes, among other physical layer (and even some non-physical layer) tasks, while not adding detrimentally high levels of additional latency to the retimer. An extension device, such as retimer 710, may be further equipped with error detection logic 730, implemented fully or at least partially in dedicated hardware circuitry of the retimer 710) to enable the retimer 710 to detect a certain set of events at the retimer, such as receiver or transmitter link errors, internal errors or events of the retimer, equalization errors, among other examples. As errors and other events are detected using error detection logic 730, the error detection logic 730 may record the event in one or more event registers 735 provided in internal computer memory of the retimer 710.

An example retimer event register 735 may be implemented as an interrupt event register and provide fields or registers for a set of common or default error types, while also reserving space for device-specific error listings. In some implementations, event register 735 are defined according to a standardized format, such as according to a structured capability and/or status register, with fields of the registers defined in accordance with a particular protocol. For instance, the register 735 structure may be defined to be based on or at least partially adopt the structure and fields of an existing register defined within an interconnect protocol, such as a PCIe-based capability and status register, among other potential examples.

As events are detected and recorded within the retimer 710, the retimer 710 may communicate alerts, messages, or other signals to one or both of the upstream endpoint device 705 and downstream device 715 connected by the point-to-point link to notify the endpoint device (e.g., 705, 715), or particular logic or components of an endpoint device (e.g., an interrupt handler, baseboard management controller (BMC), system BIOS, or another event handler), that event information has been or is being written to the event register 735. In some implementations, this signal may be implemented as an in-band notification compliant with an interconnect protocol utilized on the link, such as an interrupt, or through the setting of one or more bits in an ordered set, training sequence, packet, message, or other defined signal. In other implementations, the notification of the event may be communicated out-of-band by the retimer 710, for instance, using a sideband channel (e.g., 755). In some implementations, both in-band and out-of-band notifications may be supported by the retimer 710. An out-of-band channel may be implemented, in one example, through a System Management Bus (SMBUS). In some implementations, the notification may be communicated through a dedicated interrupt pin provided on the retimer 710, among other example implementations.

Upon detecting the presence of an event recorded in the internal event register of a retimer 710 (based on detection of the event by the retimer), a system controller may access and read the event register 735 to identify details concerning the event and, if possible or relevant, initiate corrective action to remedy the event. In some implementations, the system controller may be implemented in system software (e.g., the BIOS, BMC, operating system (OS), etc.) to access the event register 735 and implement error detecting, error reporting and error correcting and thereby extend the system' RAS coverage through the fault handling mechanism facilitated by the enhanced retimer device 710. For instance, the system controller may force a retraining of the link, reconfigure one or more of the devices (e.g., 705, 710, 715) on the link, among other example actions. Through such improvements to extensions devices, such as example retimer 710, a standardized mechanism may be defined by which system software may handle error logging, signaling, and handling on links including extension devices and thereby improve overall RAS of the system, including other examples advantages.

Figure 8A:
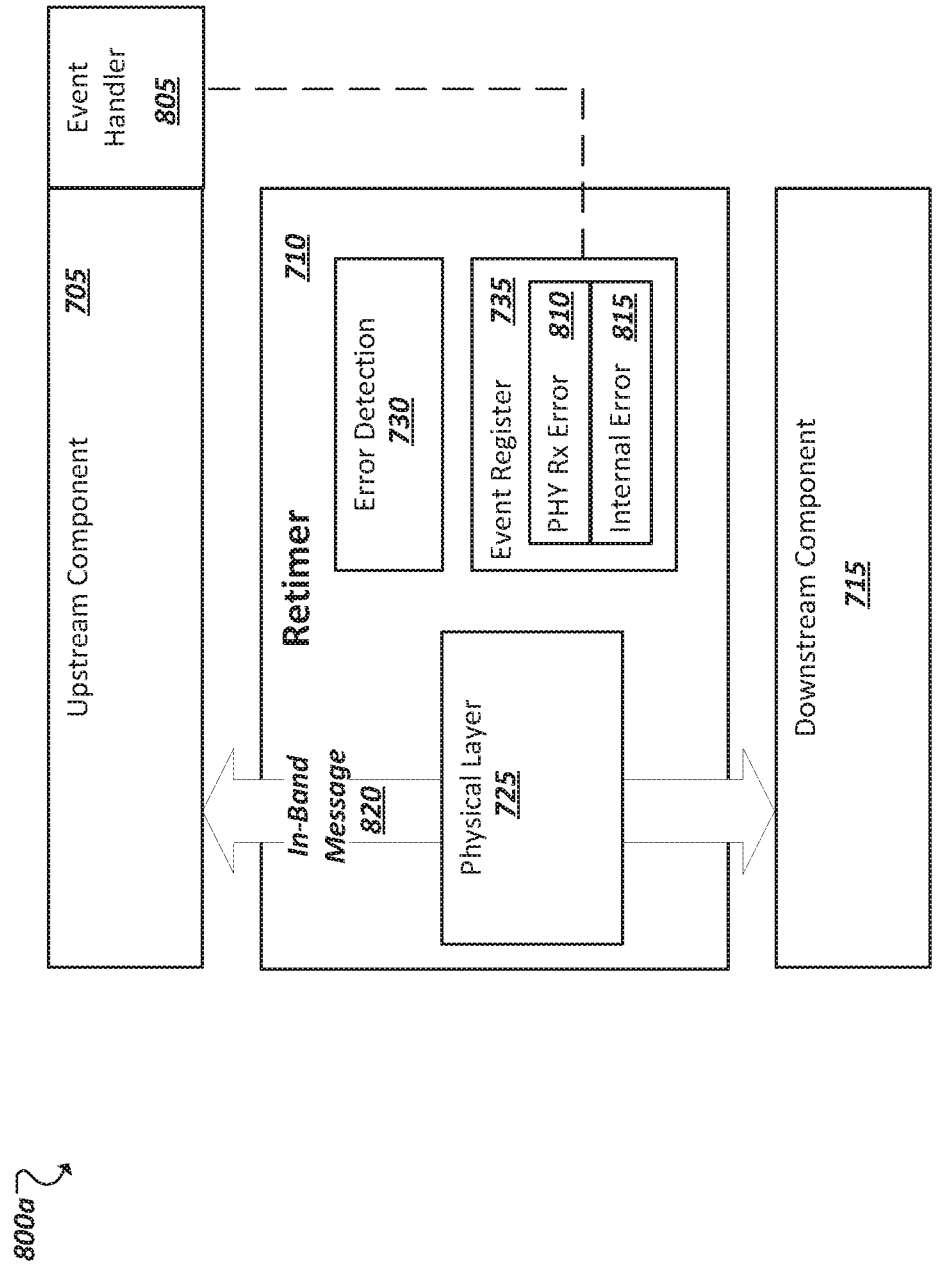
FIGS. 8A-8B illustrate examples of systems including example retimer devices equipped with error detection logic.

Turning to the example of FIG. 8A, a simplified block diagram 800a is shown illustrating an example implementation of an improved extension device (e.g., a retimer 710) including error detection logic 730 to detect various events at the extension device 710 and populate one or more register fields of event register 735 to record details regarding the detected event. In this example, the extension device may utilize protocol logic (e.g., physical layer logic 725) to communicate an in-band notification 820 of an event detected at the extension device 710. In other instances, one of the endpoint components (e.g., 705, 715) may generate the in-band message, such an interrupt (e.g., a system management interrupt (SMI), system control interrupt (SCI), message signaled interrupt (MSI), etc.). For instance, a link error may be detected at one of the upstream and/or downstream component, and this error may, in fact be based on an error occurring at the extension device 710, which the extension device 710 detects and document using error detection logic 730 and event register 735. In either instance, the in-band message 820 may be communicated to one of the endpoint components (e.g., 705) connected on the link that includes the extension device, such that an event handler (e.g., 805) managing or otherwise in communication with the endpoint component (e.g., 705) may detect that an event has been reported by the extension device through the in-band message 820. In some implementations, the event handler 805 may be implemented in system software, as system BIOS, a BMC, interrupt handler, or other component on the system of which at least device 705 is a component. In some cases, more than one event handler 805 may be present on the system and be capable of identifying and handling events detected and reported by an extension device. For instance, based on the state of the system or the time at which an event is detected and reported, a BIOS- or BMC-based event handler may be used, while during runtime an OS-based event handler may be used, among other examples.

Continuing with the example of FIG. 8A, upon (in-band) notification of an event at the extension device 710, the event handler 805, in response, may access and read the event register 735 to identify the record of the corresponding event and collect details regarding the event. Based on the type and nature of the reported event, the event handler 805 may then trigger or perform actions to remedy the event. The event handler 805 may additionally perform reporting or logging at the system level to record information gathered by and communicated the event register of the extension device, among other examples. In some implementations, error correction and recovery may include triggering a reset or retraining of the link, or other remedies defined in an interconnect protocol governing the link. In other cases, an alert, report, or service ticket may be automatically generated by the event handler to alert human or artificial intelligence (AI)-based system administrators to attempt to remedy the issue detected at the extension device 710, among other examples.

Figure 8B:
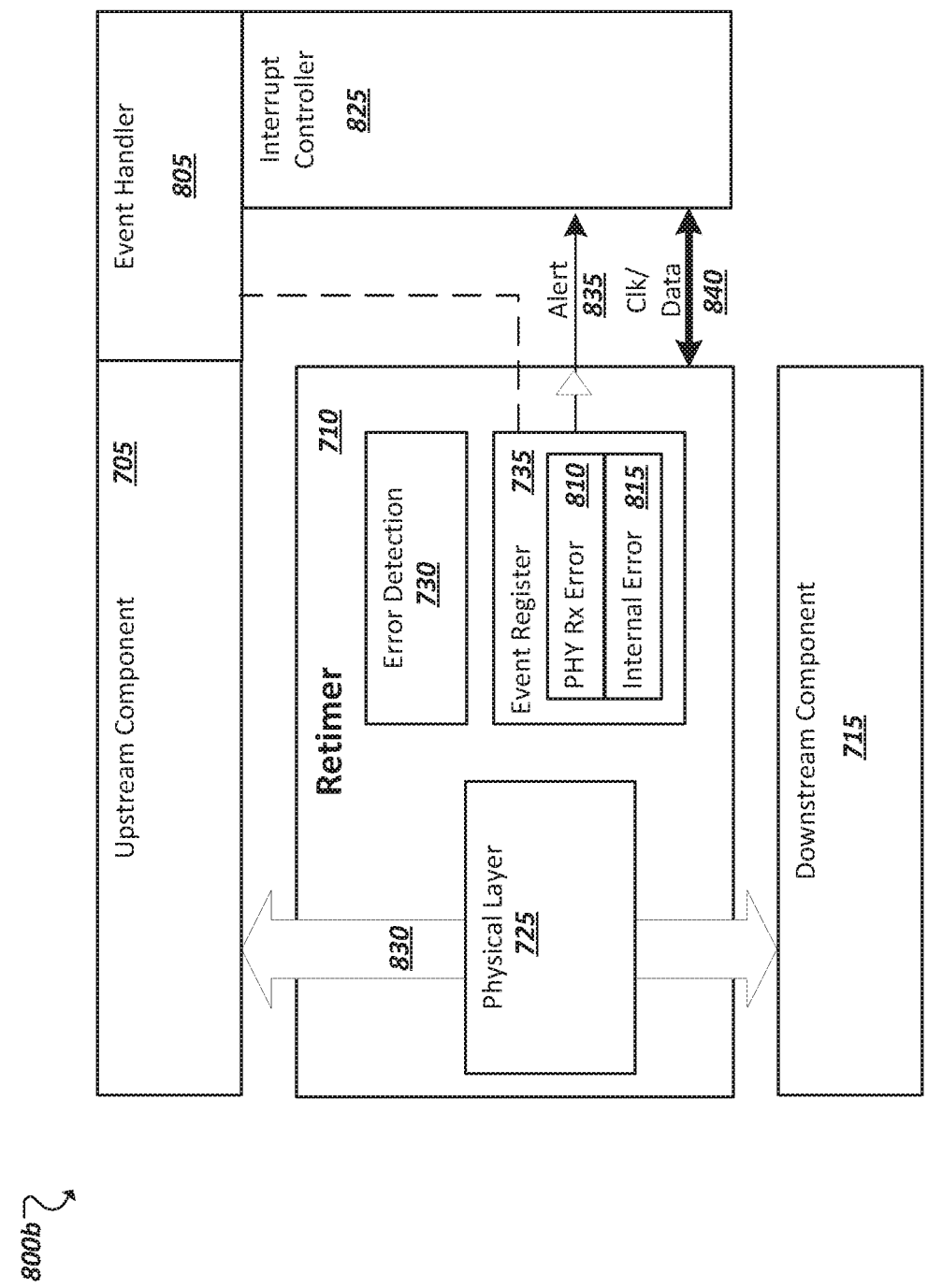

Turning to FIG. 8B, another simplified block diagram 800b is shown illustrating an implementation of an extension device equipped with error detection logic and an event register, such as discussed elsewhere herein. In the example of FIG. 8B, the extension device is further equipped with a sideband port to communicate with one or more other components over a corresponding sideband channel. In this example, the sideband channel may be used to carry data and clock signals (e.g., 840) over the sideband channel. The sideband channel can be augmented or otherwise configured to support an alert signal (e.g., sent over a dedicated lane of the sideband channel) to communicate error events detected by the extension device 710 using error detection logic 730 (i.e., rather than communicating such an event through an in-band communication channel (e.g., 830). In one example, a dedicated sideband alert pin may be provided on the extension device to send an interrupt message to an interrupt controller (e.g., 825). Other implementations may send other types of event alert message to other components of a host system or other component coupled to a system event handler (e.g., implemented in system software associated with upstream component 705). As in the example of FIG. 8A, the indication of the detected error, and with it an explicit or implicit indication that the extension device 710 also has recorded corresponding information in its local event register, may cause the event handler 805 to access and read the event register 735 and use this information to log and/or remedy the event detected by the extension device.

Enabling error detection on retimers may be particularly advantageous to detecting various types and instances of errors that may otherwise be undetectable or expensive detect using endpoint or system error detection alone. As an example, in links where two or more extension devices (e.g., retimers) are used to extend the physical length of a point-to-point link coupling two end point components, system error logic may be equipped with sufficient logic to deduct that an error detected by an endpoint, in fact, originates from a retimer, but the system may be unable of determining which of the multiple retimer was the ultimate cause of the error. As another example, some errors may be effectively undetectable to an upstream component (and corresponding system software and error handler). For instance, transmitter equalization errors may go undetected given the presence of the two or more retimers positioned in cascade on the link, as the upstream system may be unaware of Phase2/3 transmitter equalization status of the retimer(s). Additionally, internal errors in retimers, which do not trigger link errors or are otherwise incapable of discoverable by the endpoint components and system software, may go undetected, among other example issues.

As represented in FIGS. 8A-8B, an example events register may include sub-registers or fields dedicated to respective types of events. For example, physical layer errors (e.g., 810) may be one event type, internal retimer errors (e.g., 815) may be another event type, and so on. For each event types, various, more granular events may be defined, and the registers (e.g., 810, 815) may include fields specific to these respective sets of events. Further, an event register may also identify the error detecting capabilities of the extension device (e.g., 710), as well as indicate, which specific errors an event handler (e.g., 805) may be capable of or otherwise designate for reporting by the enabled extension device, among another example information. In some implementations, an event register 735 may be of a defined, standardized format. Such standardization may allow extension devices of different types, models, and manufacturers to be used interchangeably in various system implementations, without a system having to install and update different corresponding drivers for each extension device model. Instead, event handlers may expect and reuse logic (e.g., default error handling logic) to handle errors detected by and read event registers hosted on potentially any extension device model implementing the standardized event register, among other example advantages.

Figure 9:
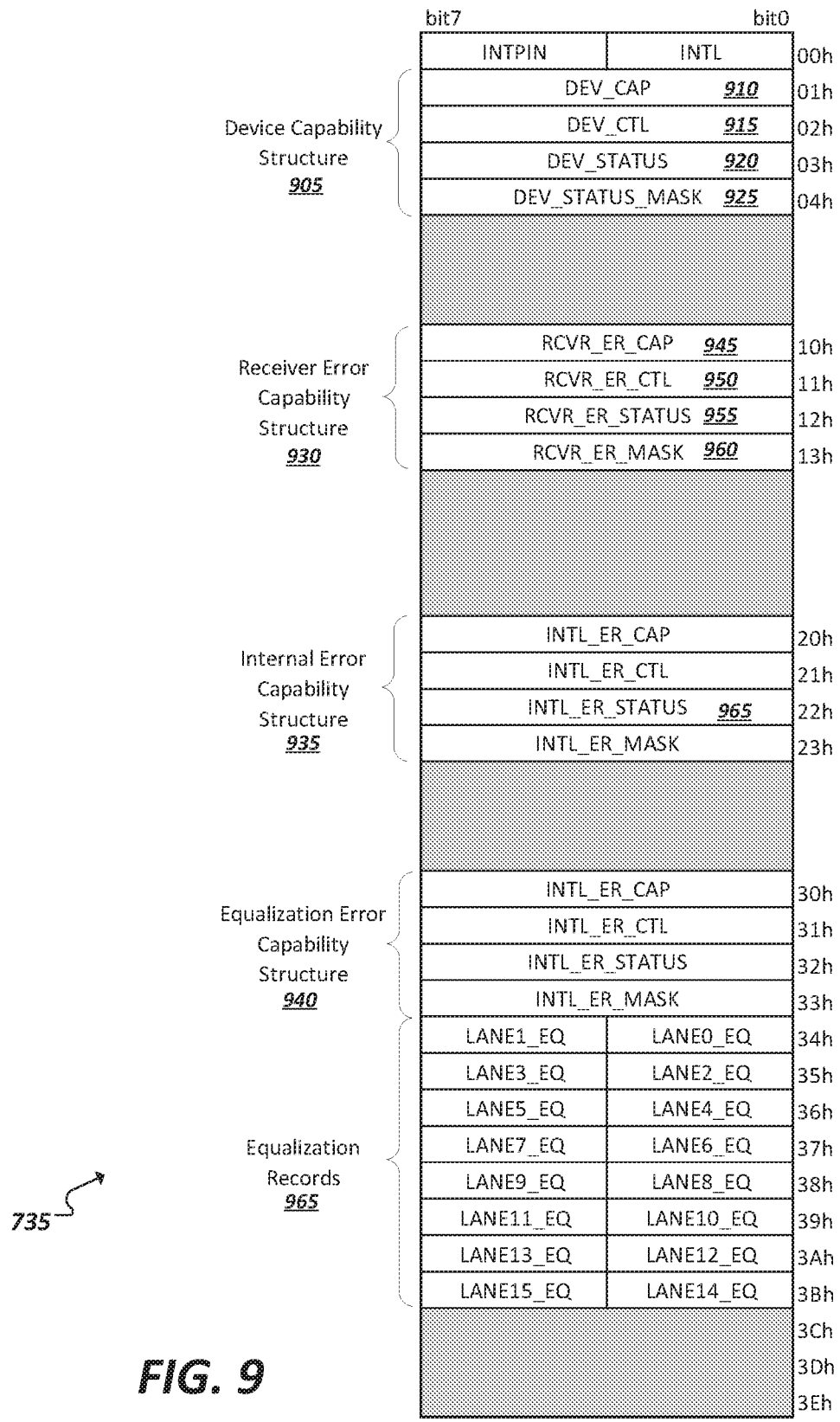
FIG. 9 is a representation of an example event register.

FIG. 9 is a representation of an example event register block 735 implemented in accordance with a defined, standardized format, which may be adopted as an event register across multiple different extension devices of various models and vendors. In the particular example of FIG. 9, an event register is provided with a format defined based on a PCIe-based capability and status register. Such a format may provide for registers to indicate the retimers error reporting capabilities, the enabling/disabling of these capabilities (e.g., by system software through the register), listings of error types, masking/unmasking of error types, status of error detection, and status control for the extension device, among other information and settings. Such information may be embodied according to a structure defined for configuration space of a system, such as PCIe Configuration Space/Extended Configuration Space.

In the particular example of FIG. 9, a PCIe-based capability and status register structure is used as the basis for an event register of a retimer. For instance, a register block may include a traditional device capability structure 905, with additional event registers 930, 935, 940, etc. for recording retimer-detected errors. In some implementations, additional records (e.g., 965) may be maintained in the register block, such as lane equalization values established at the retimer during link training, among other configuration information and other data. As represented in the particular example of FIG. 9, as may be consistent with a PCIe-based capability and status register (e.g., the Interrupt Pin register (INTPIN) and Interrupt Line register (INTL)). Similarly, capability register fields 910 may be provided for the device capability structure 905, including device control register fields 915, device status register fields 920, and a device status mask 925, which may be used to indicate general capabilities and device functions supported by the retimer (e.g., functional level reset, correctable error reporting, fatal error reporting, non-fatal error reporting, etc.), as may be defined in a specification of a PCIe-based protocol. In addition to a conventional, PCIe device capability structure 905, additional event registers 930, 935, 940, etc. may be defined, which borrow from the general PCIe device capability structure definition and correspond to various types or categories of events, which a retimer may potentially detect and record at the retimer. For instance, receiver link errors detected by the retimer, such as PHY-related receiver errors including loss of lane-to-lane skew, elastic buffer overflows, received symbol invalid errors, loss of symbol lock, loss of block alignment, etc., may be recorded in receiver error capability structure 930. Similarly, internal retimer errors, such as temperature errors, power errors, phase lock (PLL) errors, clock errors, etc., may be recorded in an internal error capability structure 935. Additionally, equalization errors, such as an upstream phase 1/2/3 error, downstream phase 1/2/3 error, etc., may be recorded in an equalization error capability structure 940, among other types of error, which may likewise be recorded in corresponding error capability structures in event register block 735.

As shown in the example of FIG. 9, in an implementation based on a PCIe control and status register, register fields of error capability structure may be based on PCIe-based capability registers. For instance, as with the device capability structure 905, an error capability structure (e.g., 930, 935, 940, etc.) may also include capability register fields (e.g., 945), control register fields (e.g., 950), a status register fields (e.g., 955), and a status mask (e.g., 960, 965), among other potential register fields. In one example, capability register fields (e.g., 945) of an error capability structure (e.g., 930, 935, 940) may be encoded with bits in one or more fields (or in a bitmask) to identify the error detection capabilities of the corresponding retimer error detection logic. For instance, a set of errors may be defined to correspond with a particular type of error (e.g., receiver errors), and the capability fields (e.g., 945) may identify which (i.e., all or a subset) of the individual errors are capable of being detected by the retimer. This information may be used by an event handler or system software accessing the event register to determine what events the system can expect to have detected and reported by the retimer. As system software or another system controller may set some of the bits and write values in the retimer's event register 735 (e.g., in control and status register fields), the system may consider the error detection capabilities of the retimer, as reported in capability register fields (e.g., 945) in determining what values to write in other register fields.

The control register fields (e.g., 950) of an error capability structure (e.g., 930, 935, 940) may be encoded with bits in one or more fields to identify how the retimer is to report the detection of particular errors. For instance, the control register field(s) (e.g., 950) may be encoded to indicate whether detection of errors of this type (or event particular errors of this type) will be reported to the system through an in-band message, a sideband message, an interrupt (or particular type of interrupt (e.g., SMI, SCI, etc.), among other example information. In some implementations, the values of the control register field (e.g., 950) will be set based on the functionality of the retimer (e.g., whether it supports in-band or sideband alerts, etc.). System software may also or instead set values in the control register field (e.g., 950) based on the preferences or capabilities of the system, its interrupt controllers, event handlers, and/or other components, among other examples.

Continuing with the example of FIG. 9, status register fields (e.g., 955, 965) of an error capability structure (e.g., 930, 935, 940) may be encoded with bits to indicate the detection of a particular error by the retimer. For instance, the retimer may detect a temperature error and, in connection with the detection of this error, set a bit corresponding to the temperature error in the status register (e.g., 965) of the internal error capability structure 935 (as the temperature error is considered, in this example, to be an internal error type). Similarly, the detection of other errors may cause corresponding bits within corresponding status register fields (e.g., 955, 965) to be set to indicate detection of the specific error at the retimer. Additional fields and bits may be provided, in some implementations, to report additional information corresponding to an error detected by the retimer. For instance, some implementations of a retimer may be equipped with sensors to indicate the temperature of the retimer measured in connection with the detection of a temperature error, among various other examples involving errors of other types and corresponding information that may be collected by retimer logic in some implementations.

An error mask (e.g., 960) may also be provided in each of the error capability structures (e.g., 930, 935, 940), through which the retimer may set a bit in the mask to identify whether the retimer should report and record particular errors in the set of errors of the particular type corresponding the error capability structure. For instance, while retimer error or event detection logic may be capable of detecting a particular error, a system may be configured to ignore such errors and may thus encode bits in the status mask (e.g., 960) to indicate to the retimer that the particular error should not be reported in the event status register by the retimer. If the error is not masked, and detection of the error is supported by the retimer, then reporting of this other error may be considered enabled through corresponding values set in the status mask (e.g., 960).

Figure 10:
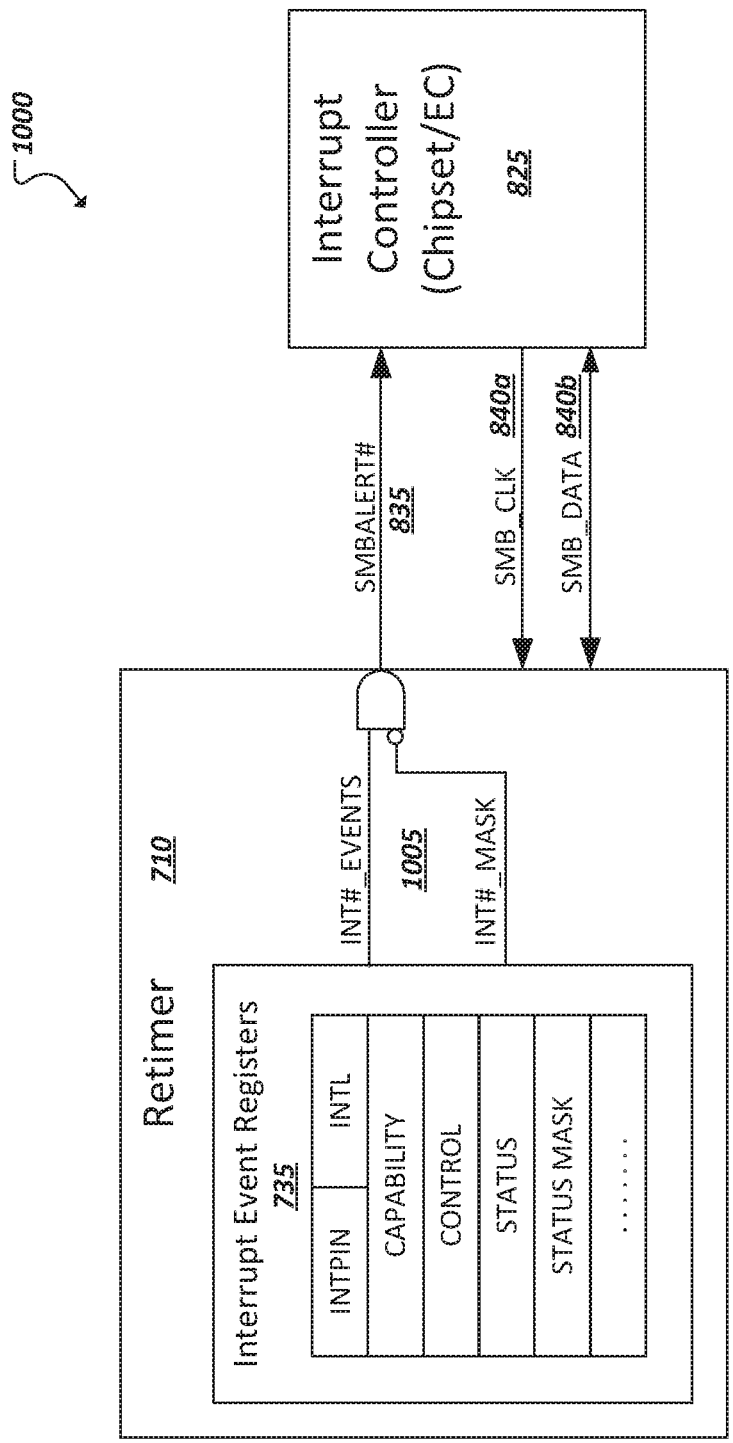
FIG. 10 is a simplified block diagram of an example retimer.

In one example, illustrated by the simplified block diagram 1000 in FIG. 10, a retimer 710 may be enhanced with error detection logic and an event register 735, such as discussed above. Similar to the example discussed in FIG. 8B, the retimer 710 may include a sideband pin(s) or port to support sideband notifications of events detected at the retimer. In one example, as illustrated in FIG. 10, the sideband channel may be implemented as a system management bus (SMBUS) that supports, in addition to clock (e.g., 840*a*) and data signaling (e.g., 840*b*), a lane or channel to support an alert signal 835 (e.g., SMBALERT#), which may be triggered through logic circuitry (e.g., 1005) of the retimer 710 based on values set in the event register(s) 735. For instance, if an event has been detected and reported (e.g., as indicated in the status register (e.g., INT#_EVENTS)) and the corresponding bit in the status mask (e.g., INT#_MASK) indicates that the event is to be reported to the system by the retimer, logic circuitry 1005 may be utilized to generate an SMBALERT# signal that is reported through the SMBUS to an interrupt controller (e.g., implemented on the chipset or as an embedded controller (EC)) 825. The alert signal 835 may then trigger system software or another event handler component of the system to access and read the contents of the event register 735 to determine the nature of the detected event and proceed with corresponding corrective action where appropriate.

Figure 11A:
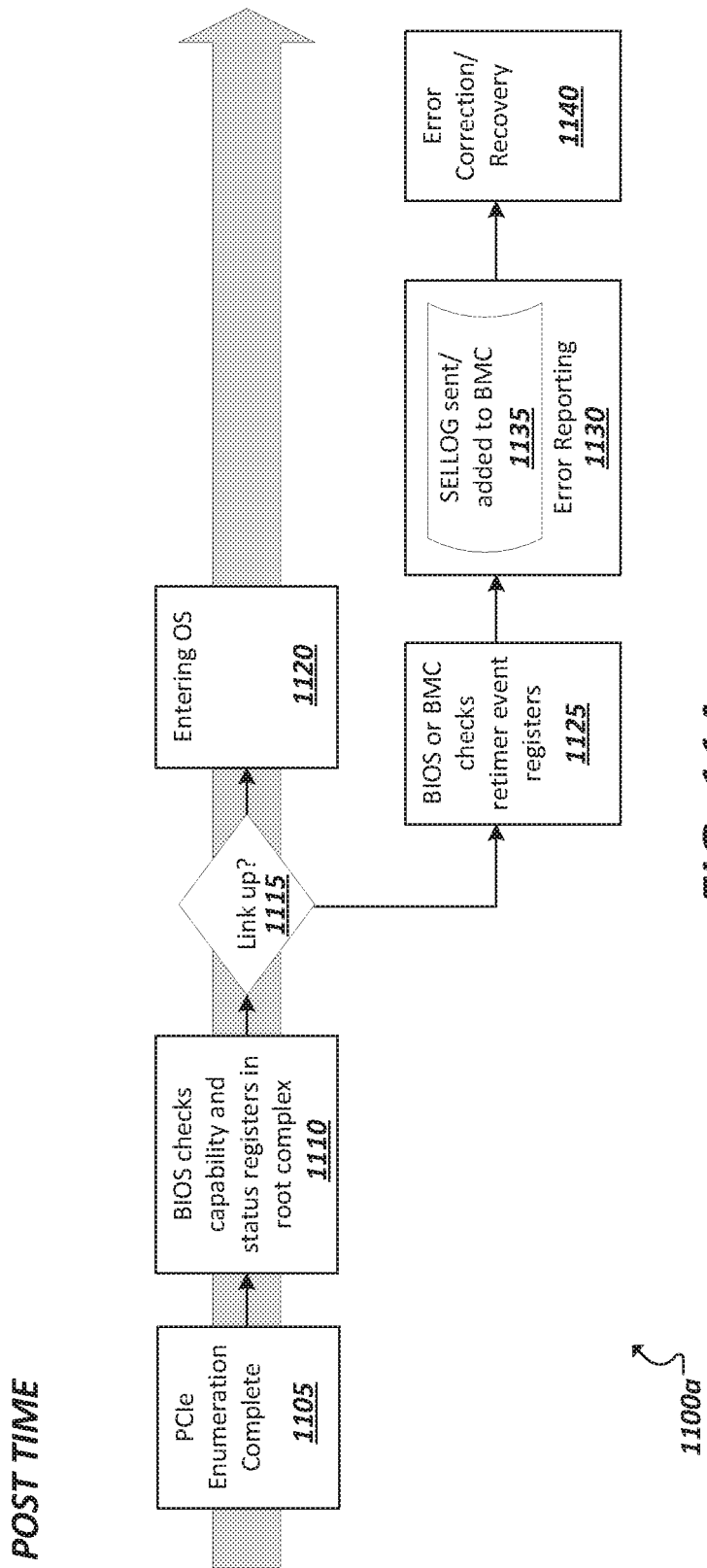
FIGS. 11A-11B are flow diagrams illustrating handling of errors detected by example extension devices.

Turning to FIG. 11A, a flow diagram 1100*a* is shown illustrating power-on self-test (POST) time error detection flow for a link with one or more retimers equipped with error detection logic and corresponding event registers. During POST time, in an implementation involving retimers on a PCIe-based link, PCIe enumeration may be completed 1105 and system BIOS may then check capability and status register(s) in the root complex (e.g., to get the link up status and rule out errors of the upstream and downstream components, etc.). If the link is established (at 1115), the BIOS may proceed to launch the operating system (at 1120). If there is an error or other issue preventing the link from being brought up or otherwise functioning properly, the BIOS, BMC, or other component (other than an OS-based component) may respond by attempting to detect the cause of the error. In connection with this activity, the BIOS, BMC, or other component may access and read event registers (at 1125) of each of the one or more retimers (or, in other implementations, redrivers) present on the link. Information collected from the retimer event register(s) may be combined with any other information collected by the controller (e.g., BIOS or the BMC) and generate log data (at 1135), such as system event log (SELLOG) data, and provide this to the BMC or another controller in connection with an error reporting stage 1130 performed by the system. This log data may then be accessed and used in an error correction/recovery stage 1140 to correct, reset, reconfigure, or otherwise attempt to remedy the detected errors.

Figure 11B:
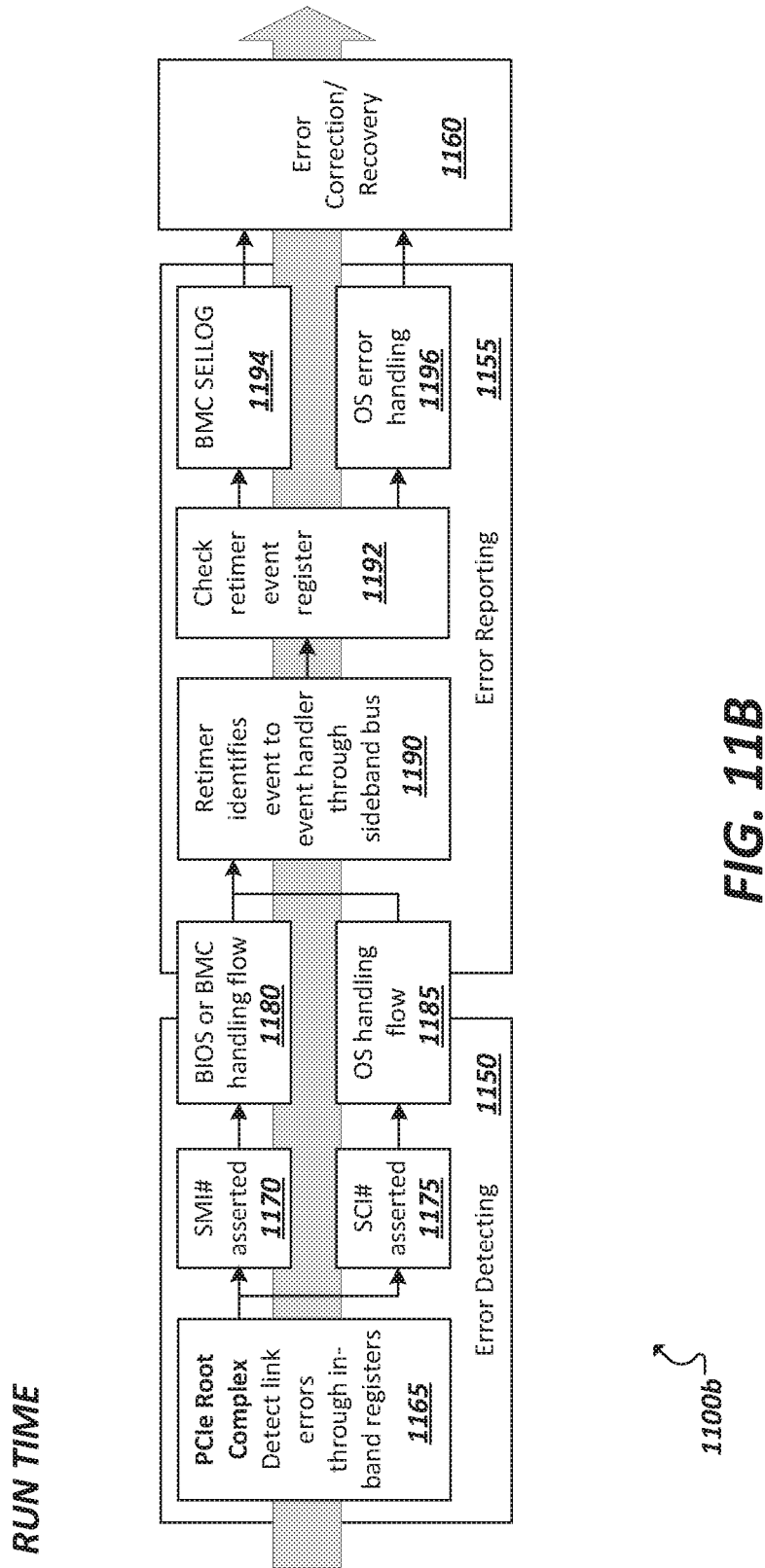

Upon successfully launching the operating system (e.g., at 1120), system POST time can transition to system runtime. As illustrated in the example of FIG. 11B, tools provided through and supported by the operating system may be relied upon (e.g., instead of system BIOS as in POST time) to address errors detected and reported at retimers, redrivers, or other extension devices on a link. For instance, during runtime, error detection 1150 may involve the detection of link errors (at 1165) through in-band registers of the root complex. For instance, an in-band interrupt message may be sent/asserted, such as an SMI 1170 or SCI 1175. In some instances, handling of the errors and interfacing with the internal event registers of extension devices on the link may be based on what type of interrupt or other error notification signal sent in-band or out-of-band with the link. For instance, in the case of SMIs, system BIOS or the BMC may handle the error (at 1180), while an SCI or other notification may be handled by the operating system event handler (at 1185), among other examples. In some cases, the retimer may send a message or other signal to indicate (at 1190) the detection of an event at the retimer. Such an alert, combined with link errors detected by the system (e.g., at 1165) can prompt the event handler (e.g., BIOS, BMS, OS, etc.) to check the retimer event register (at 1192) and discover additional information concerning the error or other event detected at the retimer and documented in the retimer event register. Depending on which system event handler is responsible for handling the error, the event can be logged by the corresponding handler (e.g., by the BMC in a SELLOG, or by the OS 1196). Such error log information may then be referenced and used by error correction and recovery logic (at 1160) implemented on the system.

While some of the examples above have made specific reference to certain particular interconnect technologies and specifications, it should be appreciated that these references are provided as non-limiting examples and that the principles discussed herein may be applied to a variety of different interconnects. As an example, while some of the examples discussed basing event registers on a PCIe-based register format or following a PCIe-based error detection and recovery flow, it should be appreciated that similar principles may be applied in and leverage data structures, protocols, and flows of other technologies and interconnects such as OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others. Indeed, a variety of alternative examples and implementations may be realized that utilize and do not depart from the principles and features discussed herein.

Figure 12:
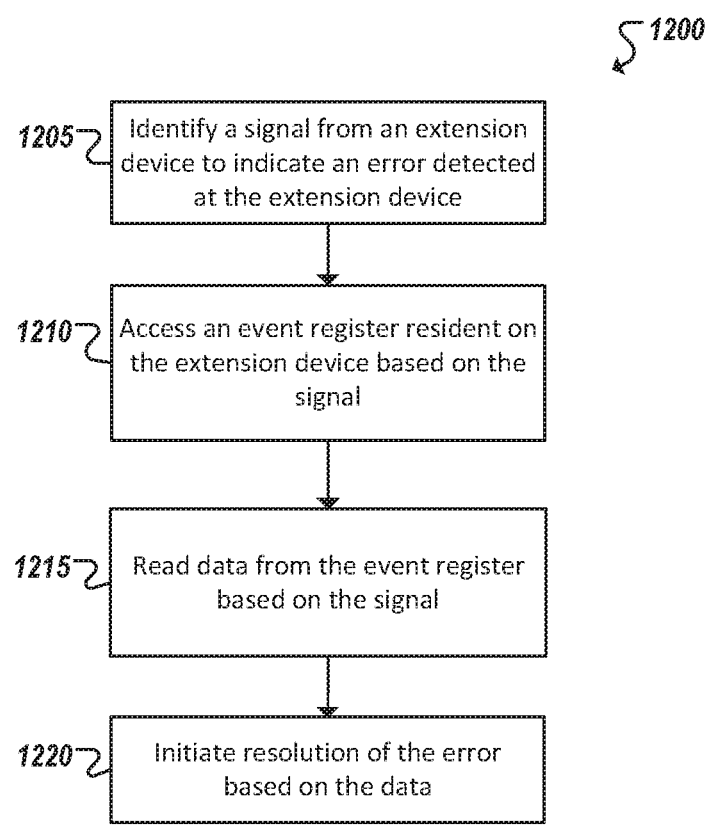
FIG. 12 is a flowchart illustrating an example technique involving error detection at extension devices.

FIG. 12 is a flowchart 1200 illustrating an example technique involving error detection at extension devices, such as retimers and redrivers, on a link. For instance, a controller, such as system software, system BIOS, the operating system, a BMC, etc. may identify 1205 a signal from an extension device positioned on a point-to-point link connecting two components in a microcomputing environment. In some instances, the signal may be sent over a sideband channel by the extension device. An event register resident in memory of the extension device may be accessed 1210 based on the signal and data may be read 1215 from the event register to identify information collected and/or reported by the extension device concerning the detected error. A resolution or corrective action may be initiated 1220 based on the data in an attempt to remedy the error.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 13:
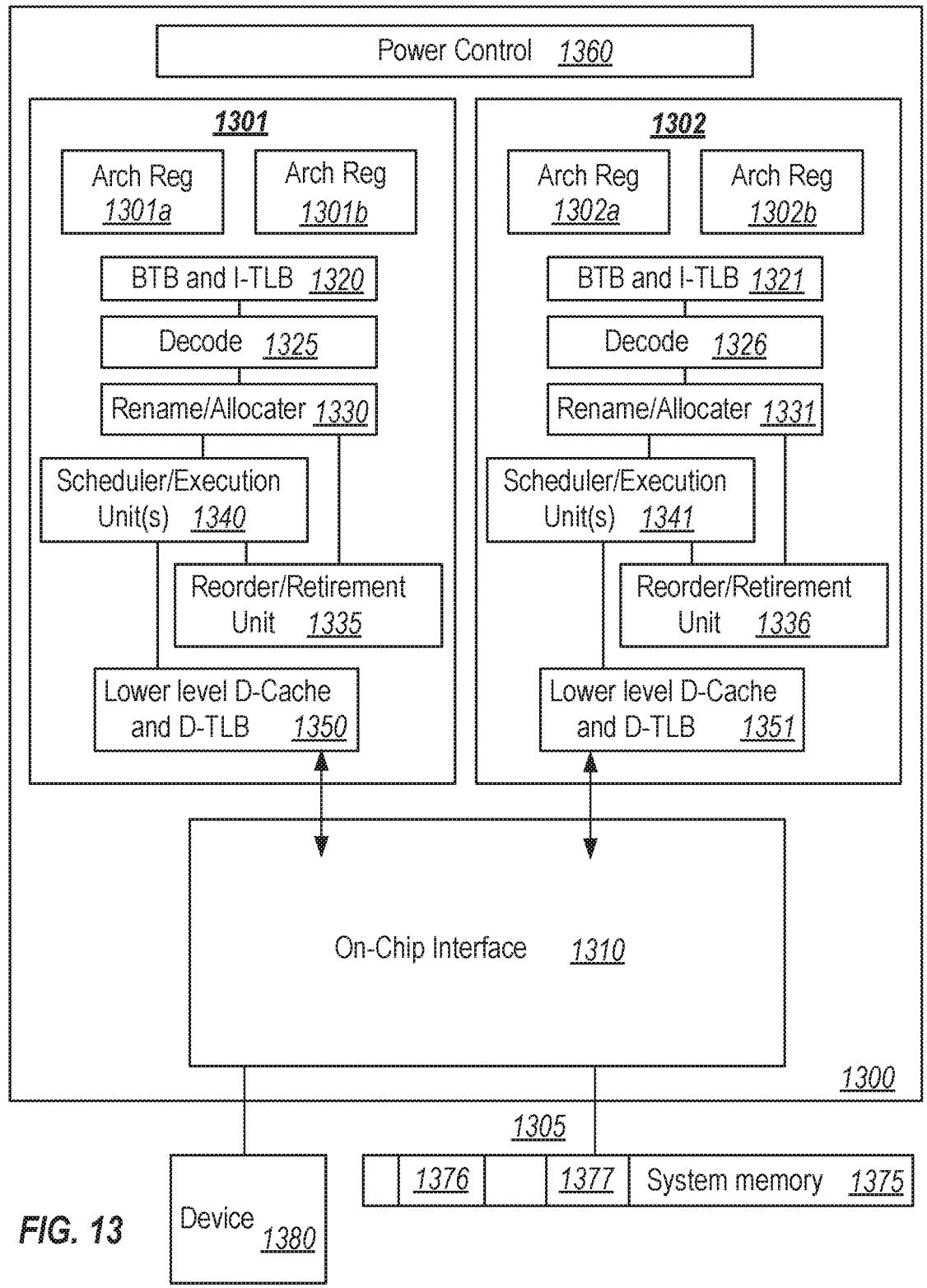
FIG. 13 illustrates an embodiment of a block diagram for a computing system including a multicore processor.

Referring to FIG. 13, an embodiment of a block diagram for a computing system including a multicore processor is depicted. Processor 1300 includes any processor or processing device, such as a microprocessor, an embedded processor, a digital signal processor (DSP), a network processor, a handheld processor, an application processor, a co-processor, a system on a chip (SOC), or other device to execute code. Processor 1300, in one embodiment, includes at least two cores—core 1301 and 1302, which may include asymmetric cores or symmetric cores (the illustrated embodiment). However, processor 1300 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1300, as illustrated in FIG. 13, includes two cores-core 1301 and 1302. Here, core 1301 and 1302 are considered symmetric cores, i.e. cores with the same configurations, functional units, and/or logic. In another embodiment, core 1301 includes an out-of-order processor core, while core 1302 includes an in-order processor core. However, cores 1301 and 1302 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1301 are described in further detail below, as the units in core 1302 operate in a similar manner in the depicted embodiment.

As depicted, core 1301 includes two hardware threads 1301a and 1301b, which may also be referred to as hardware thread slots 1301a and 1301b. Therefore, software entities, such as an operating system, in one embodiment potentially view processor 1300 as four separate processors, i.e., four logical processors or processing elements capable of executing four software threads concurrently. As alluded to above, a first thread is associated with architecture state registers 1301a, a second thread is associated with architecture state registers 1301b, a third thread may be associated with architecture state registers 1302a, and a fourth thread may be associated with architecture state registers 1302b. Here, each of the architecture state registers (1301a, 1301b, 1302a, and 1302b) may be referred to as processing elements, thread slots, or thread units, as described above. As illustrated, architecture state registers 1301a are replicated in architecture state registers 1301b, so individual architecture states/contexts are capable of being stored for logical processor 1301a and logical processor 1301b. In core 1301, other smaller resources, such as instruction pointers and renaming logic in allocator and renamer block 1330 may also be replicated for threads 1301a and 1301b. Some resources, such as re-order buffers in reorder/retirement unit 1335, ILTB 1320, load/store buffers, and queues may be shared through partitioning. Other resources, such as general purpose internal registers, page-table base register(s), low-level data-cache and data-TLB 1315, execution unit(s) 1340, and portions of out-of-order unit 1335 are potentially fully shared.

Processor 1300 often includes other resources, which may be fully shared, shared through partitioning, or dedicated by/to processing elements. In FIG. 13, an embodiment of a purely exemplary processor with illustrative logical units/resources of a processor is illustrated. Note that a processor may include, or omit, any of these functional units, as well as include any other known functional units, logic, or firmware not depicted. As illustrated, core 1301 includes a simplified, representative out-of-order (OOO) processor core. But an in-order processor may be utilized in different embodiments. The OOO core includes a branch target buffer 1320 to predict branches to be executed/taken and an instruction-translation buffer (I-TLB) 1320 to store address translation entries for instructions.

Core 1301 further includes decode module 1325 coupled to fetch unit 1320 to decode fetched elements. Fetch logic, in one embodiment, includes individual sequencers associated with thread slots 1301a, 1301b, respectively. Usually core 1301 is associated with a first ISA, which defines/specifies instructions executable on processor 1300. Often machine code instructions that are part of the first ISA include a portion of the instruction (referred to as an opcode), which references/specifies an instruction or operation to be performed. Decode logic 1325 includes circuitry that recognizes these instructions from their opcodes and passes the decoded instructions on in the pipeline for processing as defined by the first ISA. For example, as discussed in more detail below decoders 1325, in one embodiment, include logic designed or adapted to recognize specific instructions, such as transactional instruction. As a result of the recognition by decoders 1325, the architecture or core 1301 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1326, in one embodiment, recognize the same ISA (or a subset thereof). Alternatively, in a heterogeneous core environment, decoders 1326 recognize a second ISA (either a subset of the first ISA or a distinct ISA).

In one example, allocator and renamer block 1330 includes an allocator to reserve resources, such as register files to store instruction processing results. However, threads 1301a and 1301b are potentially capable of out-of-order execution, where allocator and renamer block 1330 also reserves other resources, such as reorder buffers to track instruction results. Unit 1330 may also include a register renamer to rename program/instruction reference registers to other registers internal to processor 1300. Reorder/retirement unit 1335 includes components, such as the reorder buffers mentioned above, load buffers, and store buffers, to support out-of-order execution and later in-order retirement of instructions executed out-of-order.

Scheduler and execution unit(s) block 1340, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1350 are coupled to execution unit(s) 1340. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1301 and 1302 share access to higher-level or further-out cache, such as a second level cache associated with on-chip interface 1310. Note that higher-level or further-out refers to cache levels increasing or getting further way from the execution unit(s). In one embodiment, higher-level cache is a last-level data cache—last cache in the memory hierarchy on processor 1300—such as a second or third level data cache. However, higher level cache is not so limited, as it may be associated with or include an instruction cache. A trace cache—a type of instruction cache—instead may be coupled after decoder 1325 to store recently decoded traces. Here, an instruction potentially refers to a macro-instruction (i.e. a general instruction recognized by the decoders), which may decode into a number of micro-instructions (micro-operations).

In the depicted configuration, processor 1300 also includes on-chip interface module 1310. Historically, a memory controller, which is described in more detail below, has been included in a computing system external to processor 1300. In this scenario, on-chip interface 1310 is to communicate with devices external to processor 1300, such as system memory 1375, a chipset (often including a memory controller hub to connect to memory 1375 and an I/O controller hub to connect peripheral devices), a memory controller hub, a northbridge, or other integrated circuit. And in this scenario, bus 1305 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1375 may be dedicated to processor 1300 or shared with other devices in a system. Common examples of types of memory 1375 include DRAM, SRAM, non-volatile memory (NV memory), and other known storage devices. Note that device 1380 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1300. For example in one embodiment, a memory controller hub is on the same package and/or die with processor 1300. Here, a portion of the core (an on-core portion) 1310 includes one or more controller(s) for interfacing with other devices such as memory 1375 or a graphics device 1380. The configuration including an interconnect and controllers for interfacing with such devices is often referred to as an on-core (or un-core configuration). As an example, on-chip interface 1310 includes a ring interconnect for on-chip communication and a high-speed serial point-to-point link 1305 for off-chip communication. Yet, in the SOC environment, even more devices, such as the network interface, co-processors, memory 1375, graphics processor 1380, and any other known computer devices/interface may be integrated on a single die or integrated circuit to provide small form factor with high functionality and low power consumption.

In one embodiment, processor 1300 is capable of executing a compiler, optimization, and/or translator code 1377 to compile, translate, and/or optimize application code 1376 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/ operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 14:
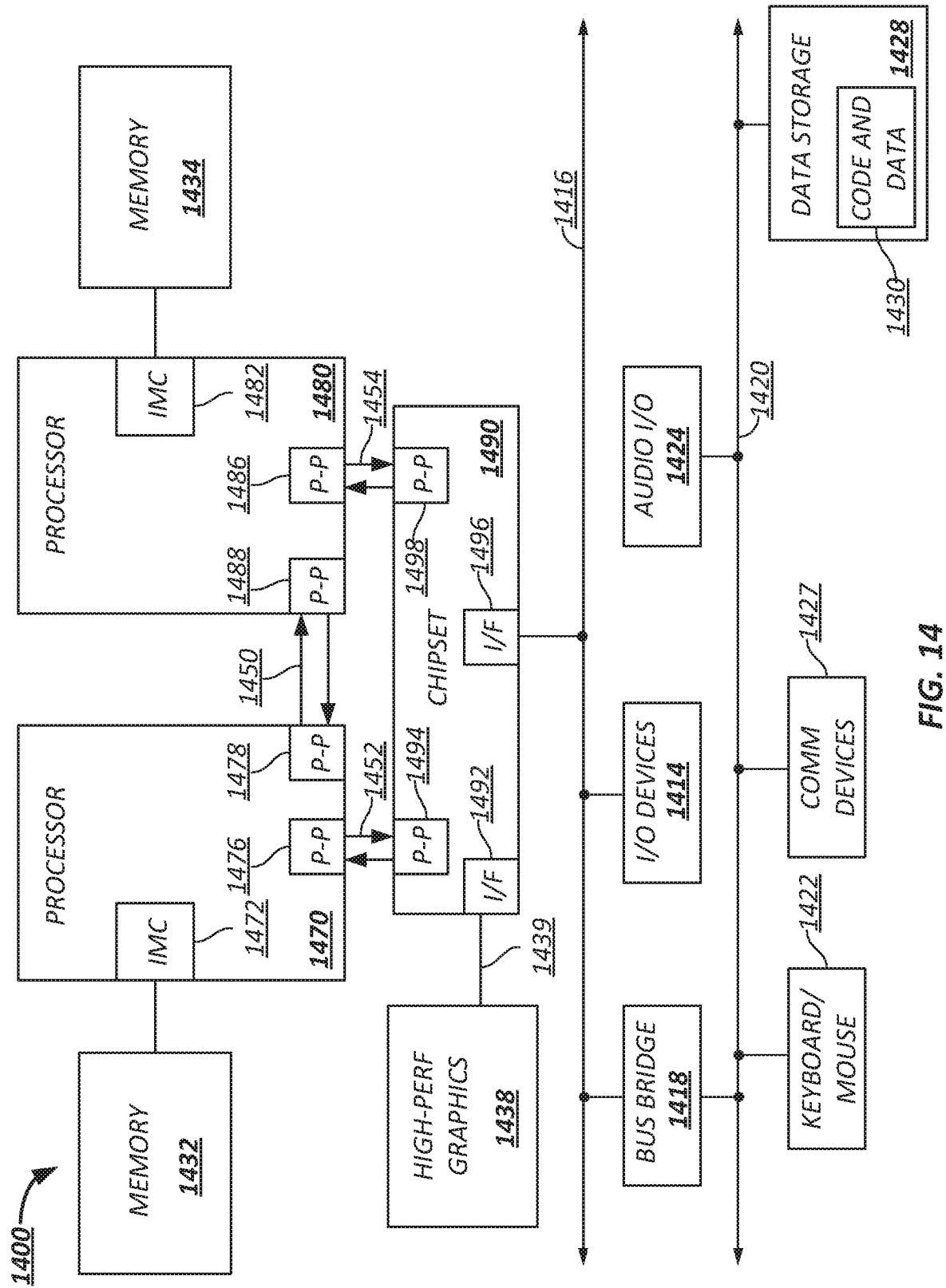
FIG. 14 illustrates an embodiment of a block for a computing system including multiple processors.

Referring now to FIG. 14, shown is a block diagram of a second system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as a high-performance architecture. As a result, the invention may be implemented within the QPI architecture.

While shown with only two processors 1470, 1480, it is to be understood that the scope of the present invention is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals): etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: a retimer to extend a point-to-point link to connect two devices, where the retimer includes: error detection circuitry to detect a set of errors at the retimer; memory to store an event register, where the retimer is to write data to the event register to describe detection of an error by the error detection circuitry; and notification logic to send a notification signal to indicate the detection of the error and presence of the data in the event register associated with the error.

Example 2 may include the subject matter of example 1, where the notification signal includes an in-band message to be sent on the link.

Example 3 may include the subject matter of example 1, where the notification signal includes a sideband signal to be sent over a sideband channel, and the retimer includes one or more pins to support the sideband channel.

Example 4 may include the subject matter of example 2, where the one or more pins include a set of data pins to communicate data over the sideband channel and a dedicated alert pin to send the notification signal.

Example 5 may include the subject matter of example 4, where the sideband channel includes a system management bus (SMBUS).

Example 6 may include the subject matter of any one of examples 1-5, where the event register is according to a standardized format associated with an interconnect protocol.

Example 7 may include the subject matter of example 6, where the interconnect protocol includes a Peripheral Component Interconnect Express (PCIe)-based protocol.

Example 8 may include the subject matter of example 7, where the standardized format is based on a PCIe capability register format.

Example 9 may include the subject matter of any one of examples 1-8, where the event register includes a respective register structure for each of a plurality of types of errors, and errors of a particular type are to be reported in a corresponding one of the register structures.

Example 10 may include the subject matter of example 9, where the plurality of types of errors include receiver errors, internal retimer errors, and equalization errors.

Example 11 may include the subject matter of any one of examples 1-10, where the event register further includes fields to indicate the set of events detectable by the error detection circuitry and fields to indicate which of the set of events are to be reported by the retimer in the event register.

Example 12 is a non-transitory, machine-accessible storage medium having instructions stored thereon, where the instructions, when executed on a machine, cause the machine to: identify a signal, sent from an extension device, to indicate that an error is detected at the extension device, where the extension device is positioned on a point-to-point link, the link is to connect two endpoint components, and the extension device is positioned between the endpoint components to extend the physical length of the link; access an event register resident on the extension device based on the signal: read data from the event register, where the data describes the error detected on the extension device: and initiate resolution of the error based on the data.

Example 13 may include the subject matter of example 12, where the instructions include instructions associated with one of a system basic input/output system (BIOS) or a baseboard management controller (BMC).

Example 14 may include the subject matter of any one of examples 12-13, where the instructions include instructions associated with an operating system.

Example 15 may include the subject matter of any one of examples 12-14, where the instructions, when executed, further cause the machine to identify a link error signal detected on at least one of the two endpoint components, where the event register is accessed and read based further on the link error signal.

Example 16 may include the subject matter of example 15, where the link error signal includes an interrupt.

Example 17 may include the subject matter of any one of examples 12-16, where the instructions, when executed, further cause the machine to generate log data to describe information associated with the error based on the data read from the event register of the extension device.

Example 18 may include the subject matter of any one of examples 12-17, where the extension device includes one of a retimer or a redriver.

Example 19 may include the subject matter of any one of examples 12-18, where the link includes a set of two or more extension devices in series positioned between the two endpoint components, and the respective event register of each of the two or more extension devices is to be read based on the signal.

Example 20 is a system including: a first device; a second device connected to the first device by a point-to-point link; and an extension device positioned between the first device and second device in the link to extend physical distance of the link. The extension device includes: error detection circuitry to detect a set of errors at the extension device; an event register, where the extension device is to write data to the event register to describe detection of an error by the error detection circuitry; and notification logic to send a notification signal to indicate the detection of the error and presence of the data in the event register associated with the error to a controller associated with at least one of the first device and the second device.

Example 21 may include the subject matter of example 20, further including the controller.

Example 22 may include the subject matter of any one of examples 20-21, further including an event handler to read the data in the event register responsive to the notification signal.

Example 23 may include the subject matter of example 22, where the event handler is further to: generate log data for the error based on the data in the event register; and initiate corrective action for the error.

Example 24 may include the subject matter of example 23, where the event handler is implemented in system basic input/output system (BIOS) or a baseboard management controller (BMC) of the system.

Example 25 may include the subject matter of example 23, where the event handler is implemented in an operating system of the system.

Example 26 may include the subject matter of any one of examples 20-25, where the extension device includes a retimer, and the retimer includes retimer circuitry to retime signals received from the first device and second device on receivers of the retimer.

Example 27 may include the subject matter of any one of examples 20-26, where the extension device is further coupled to the first device by a sideband channel and the notification signal is sent on the sideband channel.

Example 28 may include the subject matter of example 27, where the sideband channel includes a system management bus (SMBUS).

Example 29 may include the subject matter of example 28, where the SMBUS includes a pin dedicated for the notification signal.

Example 30 may include the subject matter of any one of examples 20-29, where the event register is based on a register defined for Peripheral Component Interconnect Express (PCIe)-based configuration space.

Example 31 may include the subject matter of example 30, where the register includes a PCIe control and status register.

Example 32 is a method including: identifying a signal, sent from an extension device, to indicate that an error is detected at the extension device, where the extension device is positioned on a point-to-point link, the link is to connect two endpoint components, and the extension device is positioned between the endpoint components to extend the physical length of the link; accessing an event register resident on the extension device based on the signal; reading data from the event register, where the data describes the error detected on the extension device; and initiating resolution of the error based on the data.

Example 33 may include the subject matter of example 32, further including: detecting the error at the extension device; generating the signal at the extension device; and writing the data to the event register system.

Example 34 may include the subject matter of any one of examples 32-33, where the instructions include instructions associated with one of a system basic input/output system (BIOS) or a baseboard management controller (BMC).

Example 35 may include the subject matter of any one of examples 32-34, where the instructions include instructions associated with an operating system.

Example 36 may include the subject matter of any one of examples 32-35, further including identifying a link error signal detected on at least one of the two endpoint components, where the event register is accessed and read based further on the link error signal.

Example 37 may include the subject matter of example 36, where the link error signal includes an interrupt.

Example 38 may include the subject matter of any one of examples 32-37, further including generating log data to describe information associated with the error based on the data read from the event register of the extension device.

Example 39 may include the subject matter of any one of examples 32-38, where the extension device includes one of a retimer or a redriver.

Example 40 may include the subject matter of any one of examples 32-39, where the link includes a set of two or more extension devices in series positioned between the two endpoint components, and the respective event register of each of the two or more extension devices is to be read based on the signal.

Example 41 is a system including means to perform the method of any one of examples 32-40.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a retimer to extend a point-to-point link to connect two devices, wherein the retimer comprises:
error detection circuitry to detect a set of errors at the retimer;
memory to store an event register, wherein the retimer is to write data to the event register to describe detection of an error by the error detection circuitry; and
notification logic to send a notification signal to indicate the detection of the error and presence of the data in the event register associated with the error, wherein the notification signal comprises a signal to be sent on a dedicated interrupt pin.

2. The apparatus of claim 1, wherein the event register is according to a standardized format associated with an interconnect protocol.

3. The apparatus of claim 2, wherein the interconnect protocol comprises a Peripheral Component Interconnect Express (PCIe)-based protocol.

4. The apparatus of claim 3, wherein the standardized format is based on a PCIe capability register format.

5. The apparatus of claim 1, wherein the event register comprises a respective register structure for each of a plurality of types of errors, and errors of a particular type are to be reported in a corresponding one of the register structures.

6. The apparatus of claim 5, wherein the plurality of types of errors comprise receiver errors, internal retimer errors, and equalization errors.

7. The apparatus of claim 1, wherein the event register further comprises fields to indicate the set of events detectable by the error detection circuitry and fields to indicate which of the set of events are to be reported by the retimer in the event register.

8. A system comprising:
a first device;
a second device connected to the first device by a point-to-point link; and
an extension device positioned between the first device and second device in the link to extend physical distance of the link, wherein the extension device comprises:
error detection circuitry to detect a set of errors at the extension device;
an event register, wherein the extension device is to write data to the event register to describe detection of an error by the error detection circuitry; and
a transmitter to transmit a notification signal to indicate the detection of the error and presence of the data in the event register associated with the error to a controller associated with at least one of the first device and the second device, wherein the notification signal comprises a signal to be sent on a dedicated interrupt pin.

9. The system of claim 8, further comprising the controller.

10. The system of claim 8, further comprising an event handler to read the data in the event register responsive to the notification signal.

11. The system of claim 8, wherein the event handler is further to:
generate log data for the error based on the data in the event register; and
initiate corrective action for the error.

12. The system of claim 8, wherein the extension device comprises a retimer, and the retimer comprises retimer circuitry to retime signals received from the first device and second device on receivers of the retimer.

* * * * *